United States Patent [19]

Parks et al.

[11] 4,398,768
[45] Aug. 16, 1983

[54] SIDE DUMP CART

[76] Inventors: Ronald K. Parks; Arden K. Zink, both of 10602 Olive St., Omaha, Nebr, 68128

[21] Appl. No.: 292,350

[22] Filed: Aug. 13, 1981

[51] Int. Cl.³ .............................. B60P 1/24; B62B 3/08
[52] U.S. Cl. ........................................... 298/2; 74/566; 280/47.16; 298/18; 298/38
[58] Field of Search .................... 298/2, 3, 5, 10, 17 R, 298/18, 38; 280/47.16, 47.2, 79.1 R; 74/512, 539, 542, 563, 566

[56] References Cited

U.S. PATENT DOCUMENTS

| | | | |
|---|---|---|---|
| 1,285,093 | 11/1918 | Fishel | 74/566 X |
| 1,497,478 | 6/1924 | Bludworth | 298/3 |
| 1,554,509 | 9/1925 | Kearney | 298/38 X |
| 1,633,104 | 6/1927 | Johnson | 298/38 |
| 1,834,965 | 12/1931 | Osman | 298/10 X |
| 2,634,625 | 4/1953 | Mahardy | 74/539 |
| 2,677,575 | 5/1954 | Phillips | 298/38 |
| 3,841,651 | 10/1974 | Bigney | 280/47.16 |
| 4,079,996 | 3/1978 | Vansickle | 298/38 X |

FOREIGN PATENT DOCUMENTS 614742 12/1948 United Kingdom ............. 280/47.16

Primary Examiner—Leslie J. Paperner
Attorney, Agent, or Firm—George R. Nimmer

[57] ABSTRACT

A side dump cart useful for carting lengths of pipe and steel in various forms and other items and comprising a frame with wheels, a load-carrying platform tiltably mounted thereon and held from tilting during travel by a latch which is releasable for allowing the platform to tilt for dumping the load. A safety spring maintains the latch in latching position; a guard protects the latch operating surface from accidental engagement forces; a removable catch further prevents the platfrom from tilting; and the guard and catch being released by a separate motion of the operator from the releasing of the latch.

11 Claims, 7 Drawing Figures

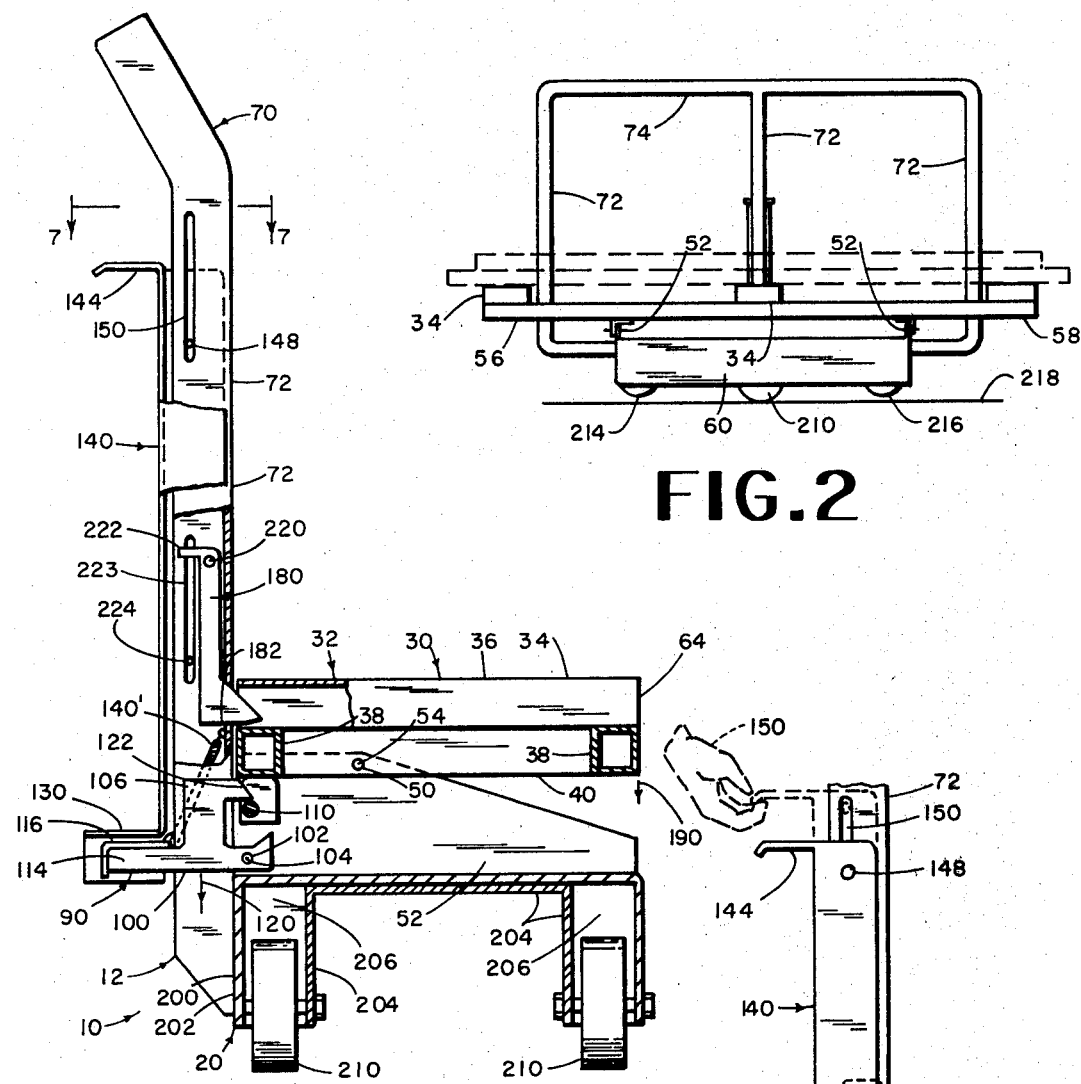
FIG.2
FIG.1
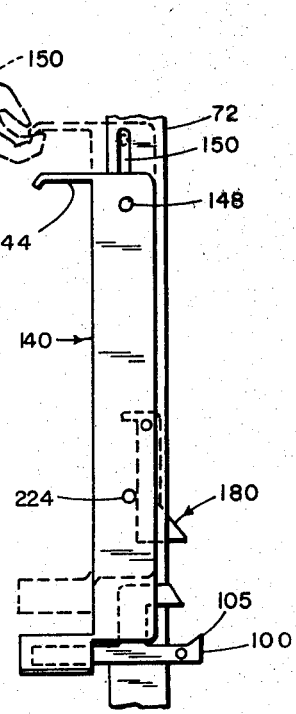
FIG.3

SIDE DUMP CART

BACKGROUND OF THE INVENTION

This invention is in the field of movement of lengths of pipe and of steel in various forms and other objects between locations in a manufacturing plant and from truck to plant or from plant to truck. Such movement is commonly done by forklift machines. A forklift can be inserted under a stack of such items, following which they can be carried to a desired location.

A forklift has many disadvantages. Forklifts most commonly have two forwardly extending fork tines and with lengths of steel extended across the tines, the steel is crosswise of the forklift, whereby its length takes up excessive space for traveling congested areas.

In addition, forklifts are expensive to purchase and to maintain.

To put such items on a common cart and push it by hand involves off-loading by hand, and this is expensive in these days of high labor costs.

It is, therefore, an object of this invention to provide a cart which will permit the load to be dumped by gravity so that off-loading is without labor cost in most cases.

Another object hereof is to provide a side dump cart which has a latch for maintaining a tilting platform in travel position, the latch being easily released by foot pressure.

Another object is to provide a guard mechanism for guarding the foot pedal of latch for preventing its being operated by accidental forces which could cause the dumping of an extremely heavy load of steel, perhaps accidentally crushing the feet of persons nearby.

Yet another object is to provide a latch with the construction such that it automatically moves the latching position under the urging of a spring when the platform is moved into travel position from dumping position.

A further object is to provide a catch for positively preventing the platform from tilting, the catch being releasable by a completely different operation by the operator, such as the catch being releasable by hand-operation as distinguished from the releasing of the latch by foot operation. This gives a double safety against accidental dumping or even dumping by a sleepy operator who is not careful.

Yet a further object is to provide for the latch guard and the catch both to be moved from travel position to releasing position by the operation of a same trigger.

BRIEF DESCRIPTION OF THE DRAWINGS

FIG. 1 is an end view of the side dump cart of this invention shown with many portions thereof broken away to reveal the operation of a latch and a catch disposed in a central part of the back of the cart.

FIG. 2 is a rear elevation of the cart of this invention as it would be seen from the left in FIG. 1 with a load thereon indicated in dotted lines.

FIG. 3 is a detail showing the latch guard and a trigger assembly for operating it, portions of the latch and portions of the catch being shown in dotted lines, other parts of the cart being broken away.

DESCRIPTION OF THE PREFERRED EMBODIMENT

Figure 4:
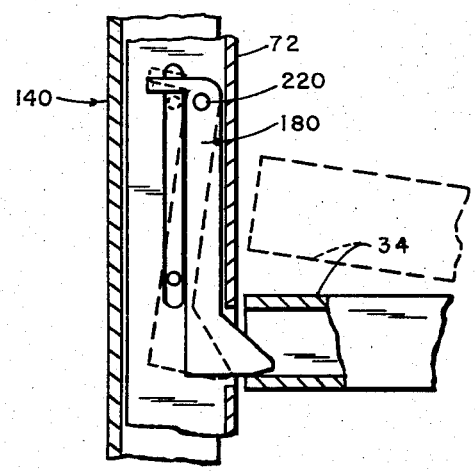
FIG. 4 is a detail showing a central part of FIG. 1 and showing the catch in releasing position in dotted lines and showing the platform in dotted lines in a position that it assumes after dumping has begun, the remaining parts of the platform and of the cart are broken away.

The side dump cart of this invention is generally indicated in FIG. 1 at 10 and comprises a frame 12, a wheel system attached to and supporting the frame is shown at 20. Wheel system 20 comprises two larger central wheels 210 and four smaller flanking end wheels 214 and 216, all wheels having their axes at right angles to platform axis 54. The two wheels 210 downwardly terminate along horizontal plane 218 located below end wheels 214 and 216.

A platform assembly 30 has a load-carrying platform generally indicated at 32 having forwardly and rearwardly extending uppermost members 34 having upper surfaces 36 disposed in a horizontal plane during travel.

The platform 32 further has lower members 38 extending from end-to-end at a right angle to and supporting and attached to the forward and rearwardly extending members 34 and has other lower members 40 which are disposed extending between forward and rearward lower members 38 and fixed thereto, the members 40 having pivot bolts 50 attached thereto and supported by upwardly extending flanges 52 of a lower part of the frame. The bolts 50 provide an axis 54 for platform tilting, the axis 54 being horizontal and extending from one end to the other of the cart. Since the cart is elongated, its ends are indicated at 56 and 58 in FIG. 2 and its forward or dumping side is shown at 60 in FIG. 2.

Figure 7:
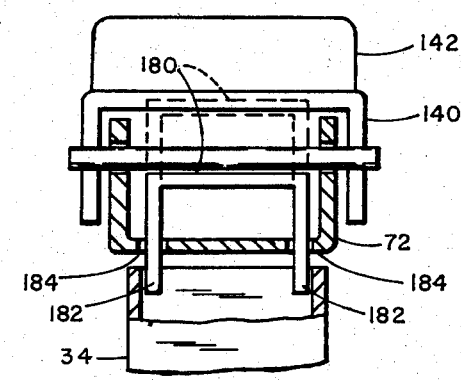
FIG. 7 is a sectional view taken along the line 7—7 of FIG. 1 and showing only the latch guard operating assembly with its trigger in full lines, a post of the cart frame in dotted lines, and a U-shaped catch with its sides flanges extending through openings in the post and out across portions of the platform, other portions of the platform being broken away.

The cart is free of obstruction on its off-load side which is its forward side 64, seen in FIG. 1, and on its rearward side there is a hand-rail system generally indicated at 70 having three posts 72, which latter are formed of U-shaped channel when seen in horizontal cross-section as at 72 in FIG. 7.

On the rearward side of the cart and at the top of the posts 72 there is a horizontal rail portion 74 interconnecting the posts 72. On the underside of the platform is a latch assembly generally indicated at 90 and comprising a latch 100 pivotally secured to a central frame member 52 by bolt 102 for pivoting about a latch axis 104 disposed in parallelism with the axis 54 of the platform.

The latch 100 has a hook 106 on the upper end thereof which is adapted to hook across the top of a latch pin 110 of the latch assembly, which latter is itself secured by a member 112 to the underside of the central part of the platform 30 whereby when the hook 106 is in latching position above the latch pin 110, the platform cannot tilt downwardly at its outer end 64.

The latch 100 further has a pressing projection 114 extending rearwardly from the post 72 and a foot pedal member 116 is attached to the projection 114 and disposed thereabove to receive thereagainst the foot of the operator for downwardly pressing on the latch so as to cause it to tilt in the direction of an arrow for unlatching from the position shown in FIG. 1.

The latch 100 has an inclined surface 122 on the forward side of its uppermost part of its hook section 106 which is adapted to be struck by the underside of the latch pin 110 as the platform 30 is returned to travel position so that the latch 100 automatically rotates out of the way for allowing the latch pin to move downwardly under the upper part of the hook 106.

A spring 140' connects the rearward end of the latch with the posts 72 above the latch so as to urge the latch into position for latching.

It can be observed that the axis 54 of the platform is preferably disposed substantially to the rearward of the center of the platform 30 for facilitating dumping of an evenly distributed load.

The upper portion of the rail 70 defined by the posts 72 and the upper rail portion 74 is preferably disposed above the bottom of the wheels three feet or more or at least two feet so as to serve as a handle by which to push and guide the cart.

Figure 6:
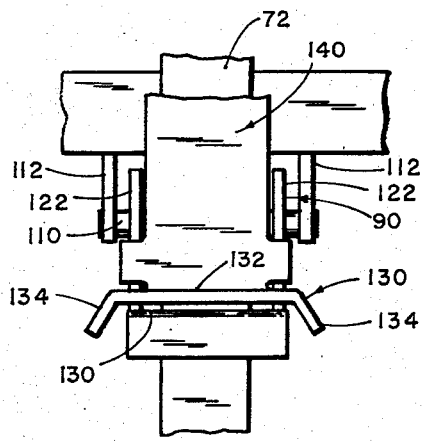
FIG. 6 is a rear elevation of a central portion of the cart as it would be seen from the left side in FIG. 1 showing the latch guard and associated mechanisms.

Referring to FIG. 1, a foot pedal guard is shown at 130 and it will be seen in FIG. 6 that the guard has a central portion 132 disposed above and spaced from the foot pedal 116 and extending horizontally. The guard 130 also has end portions 134 which extend downwardly at the ends of the foot pedal 116 and further the guard 130 extends rearwardly beyond the foot pedal 116 a substantial distance so that when the guard 130 is in place nothing can strike the foot pedal 116 from its upper side.

A control is generally indicated at 140 and comprises a U-shaped channel, as best seen in FIG. 7, which opens forwardly and which has on its rearward side a rearwardly extending portion 142 at the upper end thereof, which latter can be called the trigger having on its underside a trigger surface 144 which can be pulled upwardly by the hand of an operator as seen at 150 in FIG. 3 for raising the control 140 vertically and since it is attached to the cover 130 thereby raising the cover 130 to a position such that the operator can place his foot on the pedal 116 and operate it.

The control 140 has a pin 148 extending horizontally therethrough parallel to the platform axis 54 and the pin 148 slides freely in the vertical slot 150 in the central one of the posts 72.

A catch 180 is provided and is disposed mostly inside the central post 72, although two arm portions 182 of the catch 180 project through slots in the posts 72 and forwardly into a central one of the platform member 34, as best seen in FIG. 7. The undersurface of the catch 180 is mostly horizontal, as seen at 182, and when the catch is in position above the platform member 38 of FIG. 1, it will prevent the platform from tilting downwardly at its forward end in the direction of the arrow 190. In other words, it will prevent dumping.

The catch 180 is vertically elongated and has an upper end fixed by a pivot pin 220 to the central post 72 for pivoting about a horizontal axis parallel to the platform axis 54. The upper end of the catch 180 has a release surface portion 222 which has an undersurface capable of being struck by a releasing pin 224 of FIG. 1, which latter itself is fixed to the control 140 wherey when the control 140 is raised, then the pin 224 will strike the releasing surface member 222, causing the catch 180 to pivot at its lower end so as to swing outwardly away from the platform 30 so as to release the platform for dumping.

Since the control 140 operates both the catch and the guard 130, it can, therefore, be called a catch control, a guard control, or a catch and guard control, or simply a control, in any case being the member 140.

Figure 5:
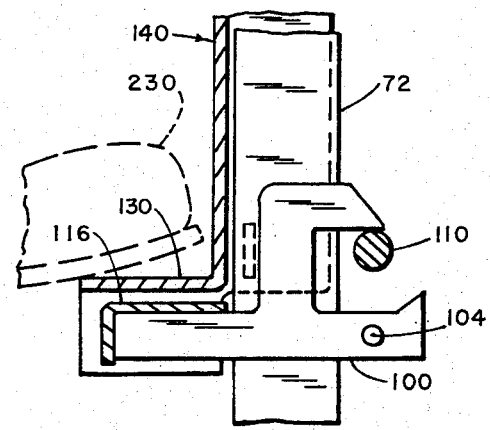
FIG. 5 is a detail showing the latch portion of the cart in an enlargement from these portions as seen in FIG. 1, but with the spring not shown and with portions of the guard broken away and other parts shown in section, a portion of the foot pedal of the guard being broken away and with no part of the platform and parts thereunder being shown, except a dog engageable by the latch and the latch pivot bolt, a forward portion of the operator's shoe being shown in dotted lines.

In operation, at times when the platform is in the FIG. 1 travel position, if the operator's foot shown partly in dotted lines at 230 in FIG. 5, should come near the foot pedal 116, it will be prevented from accidentally pressing on the foot pedal 116 by the cover or guard 130.

It is unlikely the latch 90 would ever come unlatched from a force engaging it from the underside, but even that could not cause accidental dumping because the catch 180 would prevent it.

When the guard or cover 130 is raised, even then accidental dumping cannot occur because of the latch 180.

Even if a careless or sleepy operator should raise the guard 130 by lifting at the control trigger 144, thus releasing the latch 180, still a definite intent to dump is necessary because the operator's foot must be pushed on the pedal 116 before dumping can occur.

We claim:

1. A side dump cart comprising a frame, wheels attached to and supporting said frame, a platform assembly having a load-carrying platform pivotably mounted to said frame for tilting about a substantially horizontal platform axis from a load travel position to a load dumping position, said platform having an off-load side, said cart being free of obstruction to the falling of load from said platform off-load side, a latch, means movably attaching said latch to said frame and permitting said latch to move from latching to unlatching positions, said platform assembly having means thereon releasably engageable by said latch for preventing said load-carrying platform from tilting from travel position to dumping position, said latch having a pressing means operably associated therewith and having a pressing surface which when pressed by the cart operator will cause said latch to move from latching position to unlatching position, a movable guard extending across said pressing surface for preventing accidental pressing by the operator, guard control means attached to said movable guard and movably connected to said frame for permitting the operator to intentionally move the guard away from the pressing surface, whereby upon intentional movement of the guard control means to withdraw the guard away from said pressing surface, the operator can gain access to the pressing surface and unlatch said load-carrying platform causing same to automatically tilt toward its off-load side.

2. The side dump cart of claim 1 having a safety spring operably associated with said latch and said frame and urging said latch into latching position.

3. The side dump cart of claim 1 having said load platform having a back side which is on the opposite side thereof from said off-load side thereof, said frame having a rail on said back side of said platform and extending above said platform for restraining load from falling off of said back side of said platform.

4. The side dump cart of claim 3 having said rail extending at least two feet above the bottom of said wheels so as to serve also as a handle by which to push and guide said cart.

5. The side dump cart of claim 1 having a safety catch movably mounted on said frame between platform-holding and platform-releasing positions, means on said platform assembly engageable by said catch when said catch is in holding position for holding said platform from tilting from said load travel position to said load dumping position.

6. The side dump cart of claim 5 having catch control means mounted on said frame and operably associated with said catch and having a movable trigger surface which is movable by said operator for moving said control means from a first position in which said safety catch remains in said holding position to a second position in which safety catch is operated by said control means so as to move into said platform releasing position.

7. The side dump cart of claim 6 having said trigger surface facing downwardly and said catch control means being operated for catch release only when said trigger surface is moved upwardly so that persons or objects striking downwardly on said catch control means will not cause release of said catch.

8. The side dump cart of claim 6 having said pressing surface upwardly facing and pressable by a foot of said operator, a movable guard which when in guarding position is disposed over the top of said pressing surface to prevent accidental pressing thereof, guard control means attached to said guard and movably connected to said frame for movement to raise said guard from said pressing surface into an un-guard position sufficiently for an operator's foot to be pressed against said pressing surface, said guard control means and said catch control means being interconnected so that when said trigger surface is moved said guard is moved to said un-guard position and said catch is moved to said platform releasing position.

9. The side dump cart of claim 1 having said pressing surface upwardly facing and pressable by a foot of said operator, a movable guard which when in guarding position is disposed over the top of said pressing surface to prevent accidental pressing thereof, guard control means attached to said guard and movably connected to said frame for movement to raise said guard from said pressing surface into an un-guard position sufficiently for an operator's foot to be pressed against said pressing surface.

10. The side dump cart of claim 1 having a wheel system comprising a pair of central wheels and pairs of end wheels, said central wheels downwardly terminating along a plane located below said end wheels.

11. The side dump cart of claim 10 having said wheel axes being at right angles to said platform axis.

* * * * *